(12) United States Patent
Clark et al.

(10) Patent No.: US 7,264,362 B2
(45) Date of Patent: Sep. 4, 2007

(54) LENS COVER

(75) Inventors: Stephan R. Clark, Albany, OR (US);
Glen Allen Oross, Corvallis, OR (US);
Peter M. On, Corvallis, OR (US);
Dennis R. Esterberg, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 152 days.

(21) Appl. No.: 11/082,589

(22) Filed: Mar. 17, 2005

(65) Prior Publication Data

US 2006/0209271 A1    Sep. 21, 2006

(51) Int. Cl.
*G03B 21/14* (2006.01)
*G03B 21/22* (2006.01)

(52) U.S. Cl. ...................... 353/119; 353/101
(58) Field of Classification Search .............. 353/94, 353/96, 97, 100, 101, 119; 352/40, 41, 104, 352/133, 136, 139, 140, 142, 242, 113
See application file for complete search history.

(56) References Cited

U.S. PATENT DOCUMENTS

| 761,390 A | 5/1904 | Nehring |
| 772,471 A | 10/1904 | Nehring |
| 971,798 A | 1/1910 | Sorndal |
| 1,852,450 A | 4/1932 | Dina |
| 1,932,204 A | 10/1933 | Dina |
| 2,216,478 A | 10/1940 | Paillard |
| 2,679,784 A * | 6/1954 | Simmon ............ 353/87 |
| 4,092,063 A | 5/1978 | Koester |
| 4,350,415 A | 9/1982 | Conrad |
| 5,477,283 A * | 12/1995 | Casey ............ 353/62 |
| 5,852,519 A | 12/1998 | Do et al. |
| 6,364,491 B1 | 4/2002 | Okada et al. |
| 6,587,159 B1 * | 7/2003 | Dewald ............ 348/744 |
| 6,674,584 B2 | 1/2004 | Anderson |
| 6,733,141 B2 | 5/2004 | Lee |
| 6,808,273 B2 | 10/2004 | Morinaga |
| D497,929 S * | 11/2004 | Ohki et al. ............ D16/230 |
| 6,877,864 B1 * | 4/2005 | Tamura et al. ............ 353/70 |
| 2004/0114115 A1 | 6/2004 | Runco |

FOREIGN PATENT DOCUMENTS

JP    2003029332    1/2003

* cited by examiner

*Primary Examiner*—Rodney Fuller

(57) ABSTRACT

A lens cover that may be secured to a case of a projector is herein disclosed. The lens cover has incorporated therein a lens that may be aligned with a lens of the projector to modify the throw ratio of the projector lens.

27 Claims, 4 Drawing Sheets

LENS COVER

TECHNICAL FIELD OF THE INVENTION

The present invention relates to a lens cover that incorporates a lens.

BACKGROUND OF THE INVENTION

Many projectors used to project an image on a screen, such as, for example, in a classroom setting or the like, are provided with a single lens that projects images having a predetermined particular throw ratio. The throw ratio for a projector is a defined as the ratio between the distance between the projector and the screen and the width of the image projected. Where a projector is provided with a zoom lens, the modification of the throw ratio is relatively simple. However, zoom lenses and their associated structures are relatively expensive and when not properly cared for or operated, can become a maintenance problem. Accordingly, there is a need for a structure that permits the inexpensive and reliable modification of the throw ratio of a projector.

DETAILED DESCRIPTION

Figure 1A:
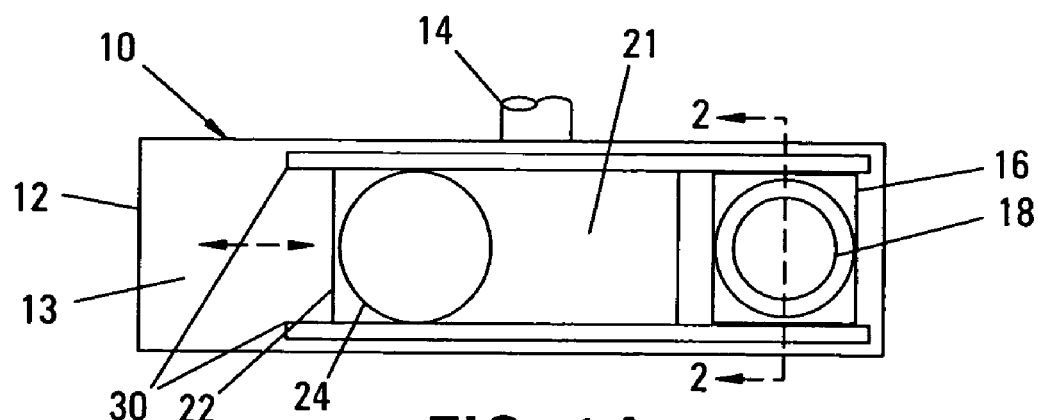
FIG. 1a is a front, schematic view of a projector having an embodiment of a sliding lens cover with a large field and a lens for modifying the throw ratio of the projector.

In the following detailed description of the invention, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

FIGS. 1-8 illustrate an embodiment of a projector 10 having a case 12 supported by a post 14. The post 14 may be secured at an upper end (not shown) to the ceiling of a room or to a support (not shown). Note that the projector 10 may also be rest on a horizontal support, shelf, or bracket and that the manner in which the projector 10 is supported is not considered to be within the scope of the present invention.

Case 12 of projector 10 has an opening 16 that is substantially aligned with a lens 18 of the projector 10. The lens 18 has a curvature that produces a throw ratio of a predetermined magnitude. The lens 18 may also have associated therewith a focusing mechanism for automatically or manually focusing an image projected through lens 18. To protect lens 18, the case 12 may be provided with a lens cover 22 that may be slid laterally across the face 13 of the case 12 to selectively cover the opening 16 of case 12. The lens cover 22 is in the embodiment illustrated in FIGS. 1-5 a planar structure or panel 21 that may be slid laterally to selectively cover opening 16. Note that in other embodiments, as exemplified by the embodiment illustrated in FIG. 8, a lens cover 22" may be provided that simply snaps into the opening 16 provided in the case 12 of projector 10. Such a lens cover 22" may be provided with a structure 25 that engages the edges of the opening 16 and which is separate from the lens cover 22" itself, or such an engagement structure 25 may be provided as an integral part of the lens cover.

Figure 1B:
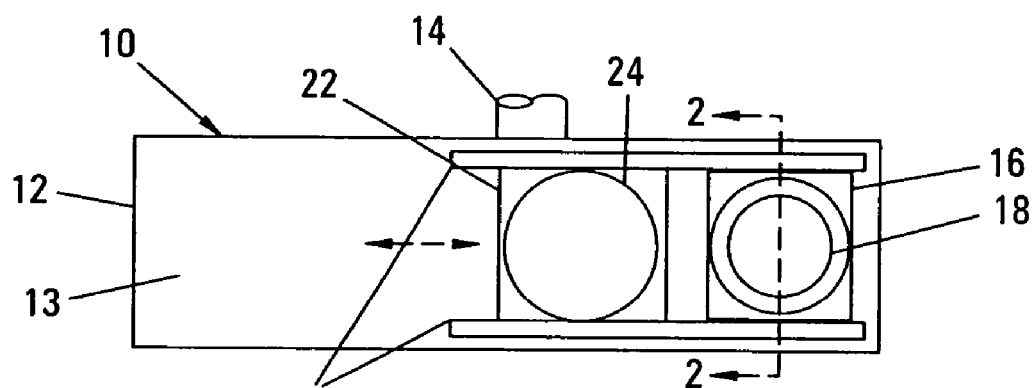
FIG. 1b is a front, schematic view of a projector having an embodiment of a sliding lens cover and a lens for modifying the throw ratio of the projector.
Figure 4A:
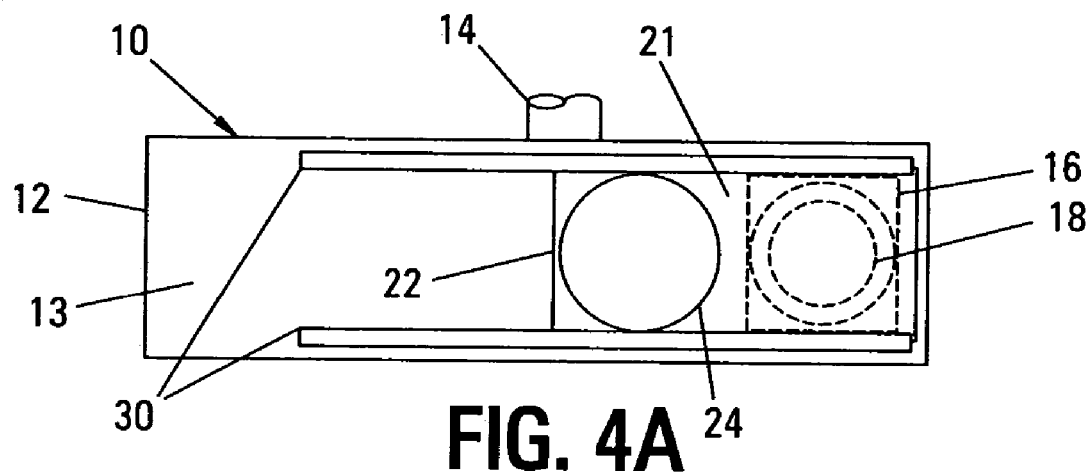
FIG. 4a is a front, schematic view of the embodiment of FIG. 1a in which the field of the lens cover is positioned to cover the lens of the projector.
Figure 4B:
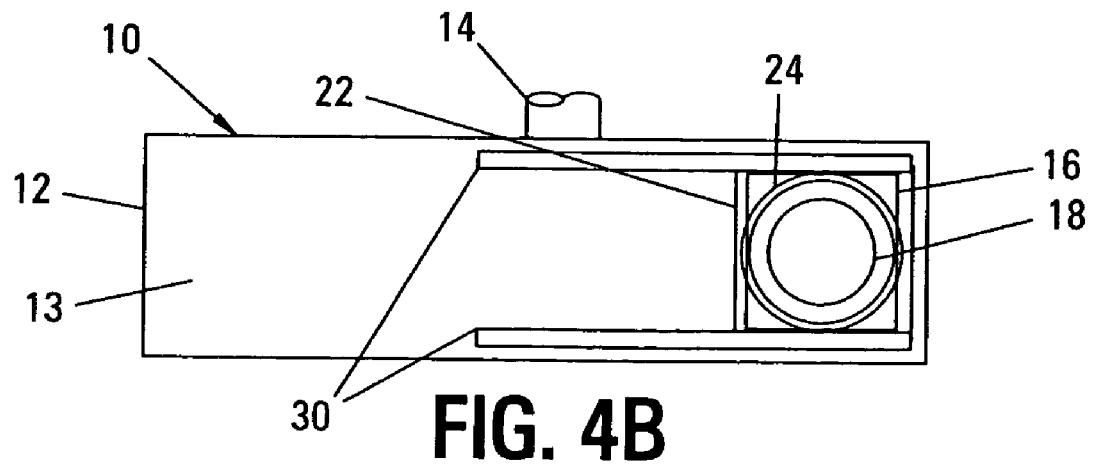
FIG. 4b is a front, schematic view of the embodiment of FIG. 1b in which the lens of the lens cover is aligned with the lens of the projector.

The lens cover 22 may be positioned as shown in FIGS. 1a and 1b such that the opening 16 is entirely clear, thereby allowing the lens 18 of the projector 10 to project an image on a screen (not shown). As seen in FIG. 4a, the field of the panel 21 of the panel of an embodiment of the lens cover 22 may also be positioned over the opening 16, thereby preventing damage to the lens 18. As seen in FIG. 4b, the lens cover 22 may also be positioned such that a lens 24 incorporated into the lens cover 22 is positioned over the lens 18 of the projector 10.

The lens 24 of the lens cover 22 (FIGS. 1-5) and 22' (FIGS. 6 and 7) may be formed integrally with the lens cover 22 as by molding the entire lens cover 22 from an optically clear plastic. Alternatively, a lens cover 22 of a chosen material may have fitted thereto a suitable lens 24. In all cases, the lens 24 is positioned in the lens cover 22 or 22' such that where the lens cover 22 is positioned over the lens 18, the lens 24 will be optically aligned with the lens 18 of the projector 10. This results in a composite lens that includes both of lenses 18 and 24. The composite lens has a throw ratio different from that of lens 18 alone.

Lens 24 may be adapted to form a composite lens having a smaller or larger throw ratio than does the projector lens 18 by itself. Accordingly, where the lens 24 is adapted to create a composite throw ratio that is larger than that of lens 18 by itself, the projector 10 may be moved farther way from a screen (not shown) on which an image is projected while still projecting the same size image. Alternatively, the distance of the projector 10 from the screen may be maintained, but a smaller, more clearly defined image may be projected.

Figure 5:
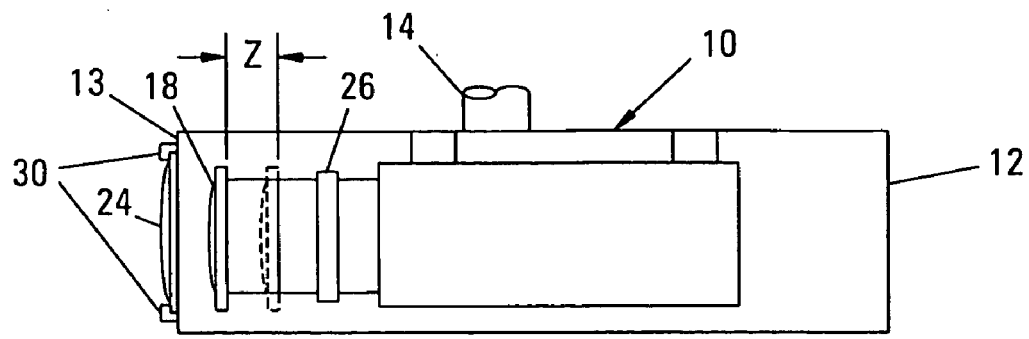
FIG. 5 is a cutaway side view of a projector that includes a zoom mechanism.

In another embodiment, where the lens 24 is adapted to produce a composite throw ratio that is smaller than that of lens 18 by itself, the projector 10 may be moved closer to a screen on which an image is projected while maintaining the width of the image or the distance between the screen and the projector 10 may be maintained and an image of larger width may be projected by the projector 10.

Where the lens 18 of projector 10 is provided with a zoom mechanism 26 as seen in FIG. 5, the lens 24 of lens cover 22 may modify the zoom range of the lens 18 and zoom mechanism 26, i.e. will increase or decrease the maximum and minimum throw ratios that define the upper and lower boundaries of the zoom range of the lens 18 and zoom mechanism 26. The zoom range of the lens 18 and zoom mechanism 26 is shown schematically by distance Z in FIG. 5.

Figure 2:
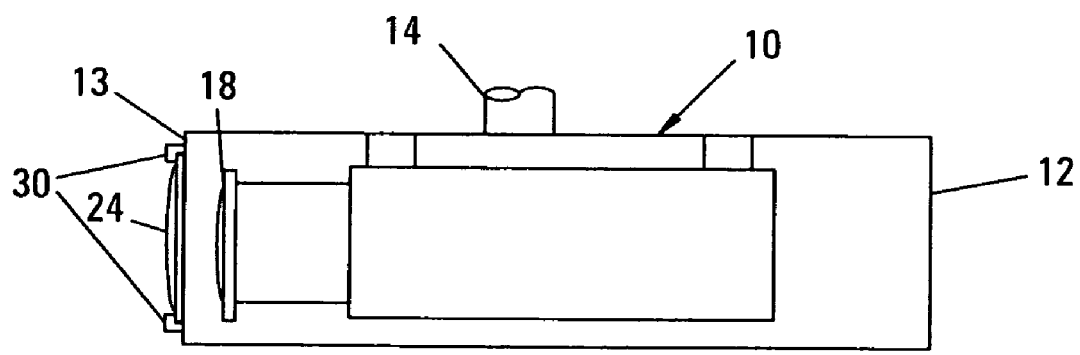
FIG. 2 is a cutaway side view of the projector of FIG. 1 taken along cutting lines 2-2.
Figure 3:
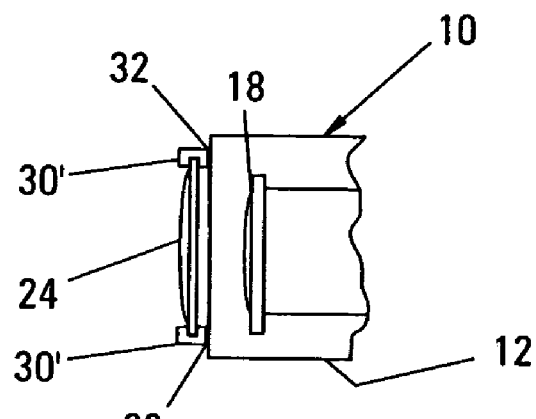
FIG. 3 is a close-up partial view of another embodiment of a sliding lens cover.

One embodiment of the lens cover 22 may be secured to the case 12 of the projector 10 by means of channel structures 30 as seen in FIGS. 1-5. In FIGS. 1 and 2, the channel structures 30 are shown as being formed integrally with the case 12. In FIG. 3, the channel structures 30' are shown as being adhered to a front surface of the case 12 by means of an adhesive such as a double-sided tape 32. Channel structures 30 and 30' define a pair of channels that slidably house opposing edges 23 of the lens cover 22. The lens cover 22 may slide laterally between its first and second positions as described above.

Figure 6:
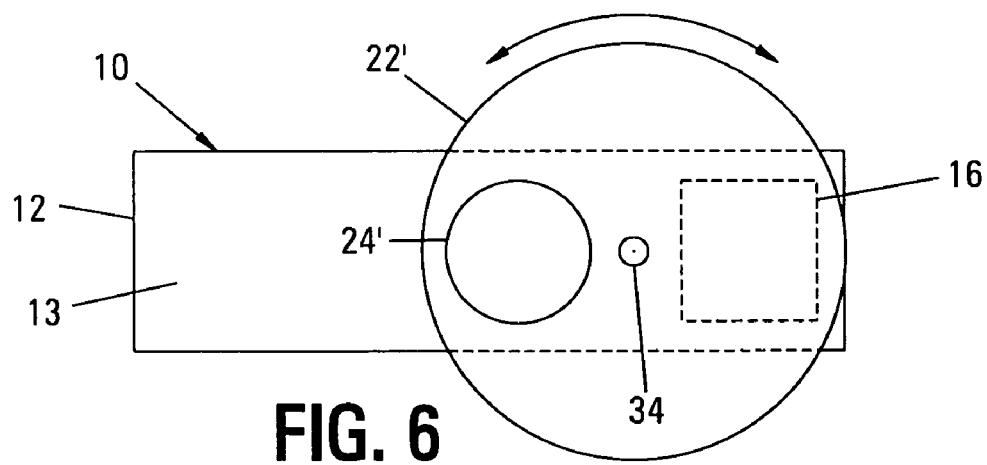
FIG. 6 is a front, schematic view of an embodiment in which the lens cover rotates.
Figure 7:
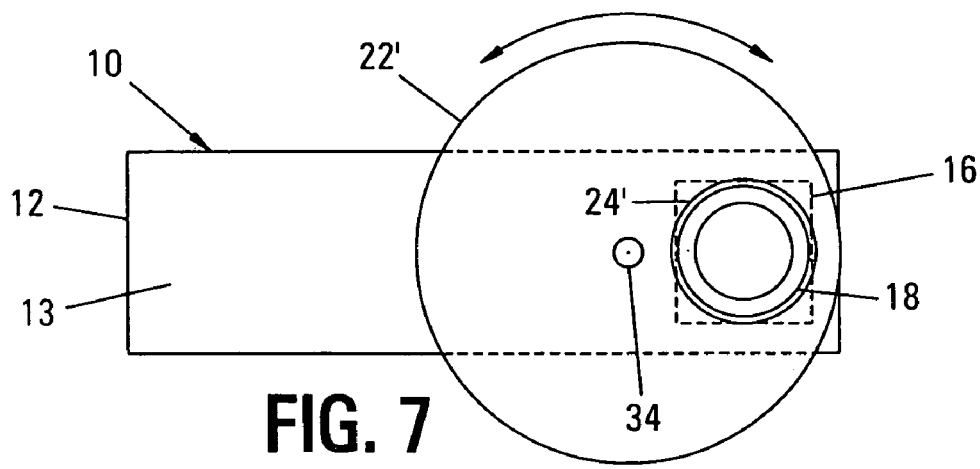
FIG. 7 is a view of the lens cover of FIG. 6 in which a lens of the lens cover is rotated into alignment with the lens of the projector.
Figure 8:
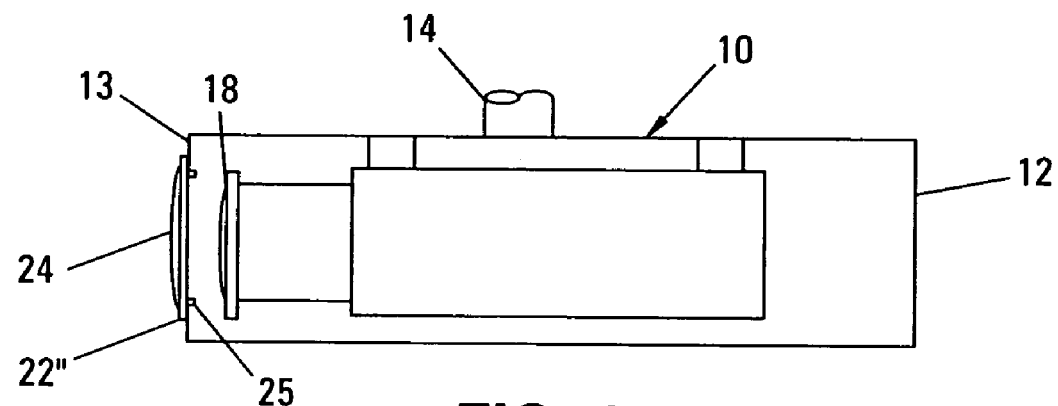
FIG. 8 is a side view of an embodiment of a lens cover that may be inserted into an opening in the projector case.

In another embodiment, the lens cover 22' is formed as a rotating structure having a lens 24' that may be rotated around an axis that is defined by a pin joint 34. Lens 24' is shown in FIG. 6 in a first, closed position in which the lens 24' is rotated out of alignment with the opening 16. In FIG. 7, the lens cover 22' is shown in a second, closed position in which the lens 24' is aligned with lens 18 of the projector 10 to modify the throw ratio thereof.

Figure 9:
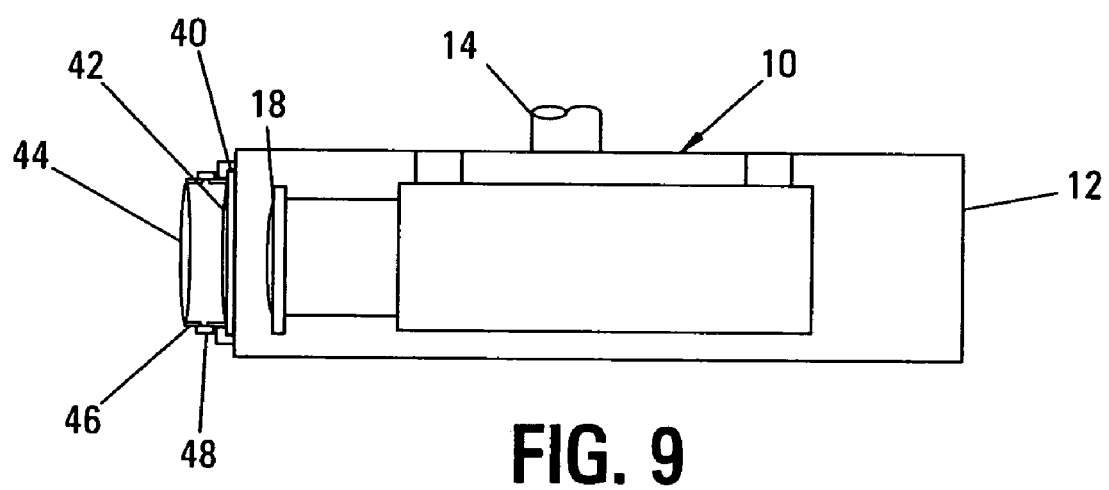
FIG. 9 is a cross-sectional side view of an embodiment of a lens cover having more than one lens elements.

In some embodiments, a lens cover will include more than a single lens or optical device. FIG. 9 illustrates another embodiment of a lens cover 40 that includes a pair of lenses 42 and 44 that are mounted on the lens cover 40. In this embodiment, the pair of lenses 42 and 44 are mounted on the sliding lens cover 40 in the same manner as lenses 24 and 24' are mounted to lens covers 22 or 22" or rotating lens cover 22'. Lenses 42 and 44 work together to modify the image projected from lens 18 of projector 10. In yet another embodiment, one of the lenses 42 or 44 may have another optical device such as a filter, polarizer, or the like substituted therefore.

In the embodiment illustrated in FIG. 9, the lens 44 is mounted on a tube structure 46 and is optically aligned with lens 42. As the addition of one or more lenses 42 and/or 44 may affect the focal point of lens 18, it may be necessary to adapt one or both of lenses 42 and 44 to compensate for the modified focal point of the resulting composite lens. In this manner, an image having a modified throw ratio that is projected by the projector 10 will be in focus. In one embodiment lens, 42 and 44 are secured to tube 46 in a fixed relationship to one another that, along with the curvature of the lenses, is adapted to provide a desired alteration in the throw ratio and a focal point that is within the range of focal points that a focusing mechanism of the projector 10 can accommodate. In another embodiment, an adjustment structure 48 is incorporated into the tube 46 to allow the lenses 42 and 44 to be adjusted with respect to one another along an optical path. In this manner, fine adjustments to the focal point and throw ratio of the composite lens may be made by altering the position of the lens 44 with respect to the lens 42. Once the focal point of the lenses 42 and 44 has been adjusted appropriately, a focusing mechanism of the projector 10 may be used to focus projected images in the normal manner. Lenses 42 and 44 may be positive lenses or negative lenses having a form best suited to the application to which they are put.

CONCLUSION

Although specific embodiments have been illustrated and described herein, it is manifestly intended that this invention be limited only by the following claims and equivalents thereof.

What is claimed is:

1. A lens cover for a projector comprising:
  a moveable panel with a lens and a non-lens field region adjacent the lens, the panel being secured to a case of the projector;
  wherein a lens of the projector is contained within the case and is aligned with an opening in the case;
  wherein the moveable panel has a first position where the lens of the moveable panel is aligned with the opening in the case and is thereby aligned with the lens of the projector; and
  wherein the moveable panel has a second position where the lens of the moveable panel is moved out of alignment with the opening in the case and thereby the lens of the projector so that the non-lens field region covers the opening in the case and thereby the lens of the projector.

2. The lens cover for a projector of claim 1 wherein the panel is movably secured to the projector by at least one linear channel.

3. The lens cover for a projector of claim 2 wherein the linear channel is formed integral with the projector.

4. The lens cover for a projector of claim 2 wherein the linear channel is secured to the projector by an adhesive.

5. The lens cover for a projector of claim 1 wherein the panel is rotatively pinned to the case such that the lens of the panel may be selectively rotated into alignment with the opening in the case and thereby the lens of the projector.

6. The lens cover for a projector of claim 1 wherein the lens of the panel forms a composite lens structure with the lens of the projector when the lens of the panel and the lens of the projector are optically aligned.

7. The lens cover for a projector of claim 6 wherein the throw ratio of the composite lens is larger than the throw ratio of the lens of the projector by itself.

8. The lens cover for a projector of claim 6 wherein the throw ratio of the composite lens is smaller than the throw ratio of the lens of the projector by itself.

9. The lens cover for a projector of claim 1 wherein the projector further comprises a zoom mechanism coupled to the lens of the projector.

10. The lens cover of a projector of claim 1 wherein the moveable panel comprises a plurality of lenses coupled thereto in optical alignment with one another such that the plurality of lenses may be selectively aligned with the opening in the case and thereby the lens of the projector.

11. The lens cover of a projector of claim 10 further comprising an adjustment mechanism coupled between a pair of the plurality of lenses of the moveable panel.

12. The lens cover of a projector of claim 10 wherein the moveable panel comprises at least one lens and at least one other optical device chosen from a group consisting of a positive lens, a negative lens, a filter, and a polarizer, the at least one lens and at least one other optical device being coupled to the moveable panel in optical alignment with one another such that the at least one lens and at least one other optical device may be selectively aligned with the opening in the case and thereby the lens of the projector.

13. A lens cover for a projector having a preexisting lens aligned with an opening in a case of the projector, the lens cover comprising a lens with an engagement structure, the engagement structure of the lens cover being adapted to removably engage an edge of the opening in the case of the projector, wherein the engagement structure is further adapted to snap into engagement with the edge of the opening in the case of the projector.

14. The lens cover of a projector of claim 13 wherein the lens cover comprises a plurality of lenses coupled thereto in optical alignment with one another such that the plurality of lenses may be selectively aligned with a preexisting lens of the projector.

15. The lens cover of a projector of claim 14 further comprising an adjustment mechanism coupled between a pair of the plurality of lenses of the lens cover.

16. The lens cover of a projector of claim 13 wherein the lens cover comprises at least one lens and at least one other optical device chosen from a group consisting of a positive lens, a negative lens, a filter, and a polarizer, the at least one lens and at least one other optical device being coupled to the lens cover in optical alignment with one another such that the at least one lens and at least one other optical device may be selectively aligned with a preexisting lens of the projector.

17. The lens cover of a projector of claim 14 wherein each of the plurality of lenses are one of a negative lens and a positive lens.

18. A method of modifying the throw ratio of a projector lens comprising:
   securing a moveable plate having a lens and a non-lens field region to a case of a projector;
   wherein the projector lens is contained within the case and is aligned with an opening in the case;
   wherein the plate has a first position where the lens of the plate is aligned with the opening in the case and thereby with the projector lens;
   wherein the plate has a second position where the lens of the plate is moved out of alignment with the opening in the case and thereby with the projector lens so that the non-lens field region covers the opening in the case and thereby the projector lens; and
   aligning the lens of the plate with the opening in the case and thereby with the projector lens to form a composite lens that has a different throw ratio than the projector lens by itself.

19. The method of modifying the throw ratio of a projector lens of claim 18 wherein the lens of the moveable plate is a composite lens comprising a plurality of optical devices chosen from a group consisting of a negative lens, a positive lens, a filter, and a polarizer.

20. The method of modifying the throw ratio of a projector lens of claim 19 further comprising adjusting the position of at least one of the plurality of optical devices along an optical path with respect to the position of at least one other optical device.

21. The method of modifying the throw ratio of a projector lens of claim 18 further comprising rotating the plate to align the lens of the plate with the opening in the case and thereby the projector lens.

22. The method of modifying the throw ratio of a projector lens of claim 21 further comprising actuating a zoom mechanism to modify the throw ratio of the aligned lenses.

23. The method of modifying the throw ratio of a projector lens of claim 18 further comprising sliding the plate to align the lens of the plate with the opening in the case and thereby the projector lens.

24. The method of modifying the throw ratio of a projector lens of claim 23 further comprising actuating a zoom mechanism to modify the throw ratio of the aligned lenses.

25. A cover for selectively protecting a lens of a projector and altering the throw ratio of the lens of the projector comprising:
   a first optical means and a second optical means coupled to one another in optical alignment with one another; and
   a cover means movably coupled to a case of the projector that contains the lens of the projector within, the cover means having first and second adjacent portions, the first and second optical means being coupled to the second portion of the cover means;
   wherein the cover means can be moved, relative to the case, between first and second positions;
   wherein when the cover means is in the first position, the first portion of the cover means covers an opening in the case that is aligned with the lens of the projector so that the first portion of the cover means covers the lens of the projector and so that the first and second optical means are out of alignment with the opening in the case; and
   wherein when the cover means is in the second position the first and second optical means are aligned with the opening in the case and thereby the lens of the projector.

26. The cover of claim 25 further comprising an adjustment means coupled between the first and second optical means to modify the relative distance between the first and second optical means along an optical path.

27. The cover of claim 26 wherein at least one of the first or second optical means is chosen from a group consisting of a negative lens, a positive lens, a filter, and a polarizer.

* * * * *